March 14, 1967     D. E. NICHOLS     3,308,655
VEHICLE FUEL CONSUMPTION INDICATING INSTRUMENT
Filed Nov. 4, 1963     2 Sheets-Sheet 1

INVENTOR.
DONALD E. NICHOLS

BY

*Smith & Mattern*

ATTORNEYS

March 14, 1967     D. E. NICHOLS     3,308,655

VEHICLE FUEL CONSUMPTION INDICATING INSTRUMENT

Filed Nov. 4, 1963     2 Sheets-Sheet 2

INVENTOR.
DONALD E. NICHOLS

BY

Smith & Mattern

ATTORNEYS

United States Patent Office 3,308,655
Patented Mar. 14, 1967

3,308,655
VEHICLE FUEL CONSUMPTION INDICATING INSTRUMENT
Donald E. Nichols, 11228 28th Ave. SW., Seattle, Wash. 98146
Filed Nov. 4, 1963, Ser. No. 321,126
5 Claims. (Cl. 73—114)

This invention relates to an indicating instrument assembly for installation on a vehicle to present engine performance data to an operator, inclusive of speed, fuel flow, and distance traveled per unit of fuel consumption.

The purpose of this invention is to provide such an indicating instrument assembly which gives a vehicle operator an opportunity at all times of observing accurate and instantaneous performance data concerning his vehicle while underway. By having such information constantly available, he is capable of operating the vehicle at its maximum efficiency.

The invention, briefly described, comprises: one assembly of components directed to sensing speed of a vehicle and presenting resulting speed on a movable indicia dial; another assembly of components for sensing fuel consumption and presenting fuel consumption on another movable indicia dial, and additional components necessary to move these respective speed and fuel consumption indicia dials in accordance with independent logarithmic motions of one dial relative to the other dial wherein, by suitable cross-references on the dials, a third variable, distance traveled per unit of fuel consumption, is derived from these direct monitoring observations made of the vehicle's speed and fuel consumption.

Indicating instrument assemblies have been provided in the past to monitor these two variables presenting their respective data results and in addition presenting a derived result based upon observation of initial variable indicia. However, the indicating instrument assembly described in this application has distinguishing structural and operational aspects whereby the data sought is obtained more accurately and reliably upon a minimum incurrence of cost in production, installation and operation of the instrumentation.

A preferred embodiment of the invention, arranged for installation on a marine vehicle, is illustrated in accompanying drawings wherein.

Figure 1:
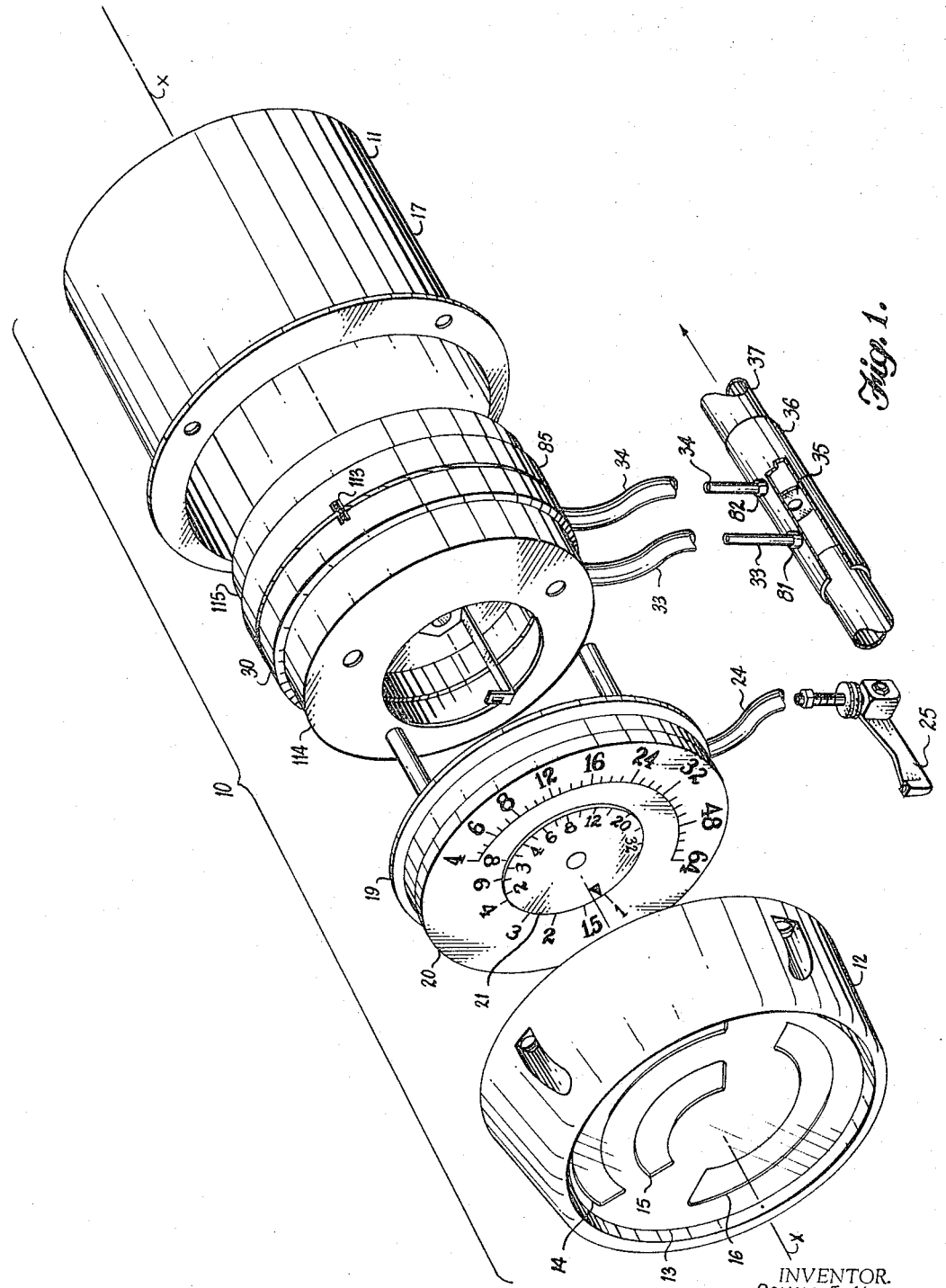
FIGURE 1 is a perspective, schematic, exploded view of the indicating instrument assembly.

A preferred embodiment of the indicating instrument assembly 10 arranged for utilization on a marine vericle is illustrated in the exploded view of FIGURE 1. At either end along an expanded central reference axis x—x of the instrument are portions of a housing 11 which are optionally included, as necessary, if the indicating instrument assembly is installed in a vehicle following its initial production. There is a cover housing 12 containing a mask dial face 13 having three principle openings wherein the operator reads the distance traveled per unit of time 14; fuel used per unit of time 15; and distance traveled per unit of fuel 16. The other main portion 17 of the housing primarily is used to keep units together, free of debris and protected from harm.

Figure 2:
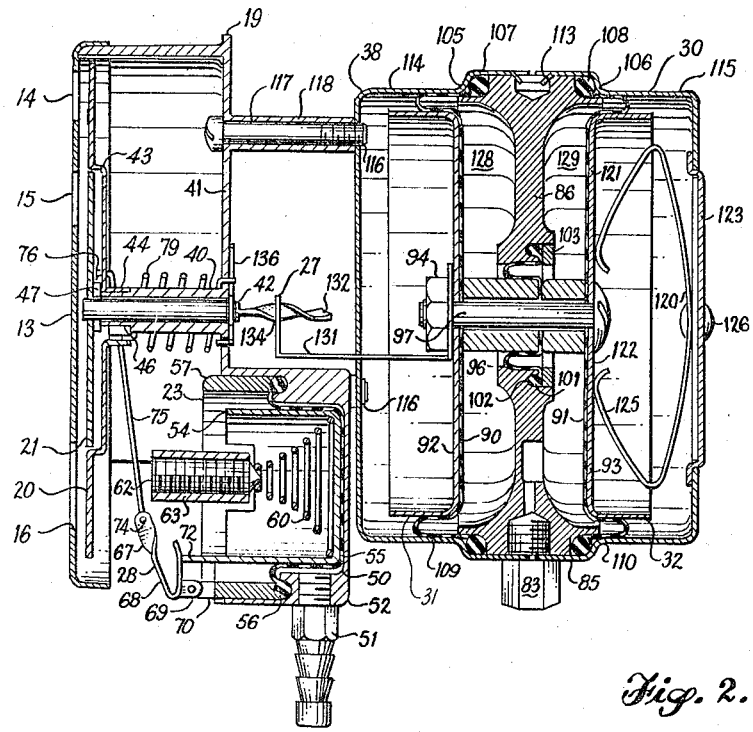
FIGURE 2 is a vertical cross-section of the indicating instrument structure which is placed near the operator of the vehicle.

In FIGURE 1, between these cover housing sections a forward subassembly unit 19 is located to support two rotatable dials or discs 20, 21 arranged to partially revolve about a common reference axis x—x. Also included in this forward subassembly unit 10, as shown in FIGURE 2, is a component 23 to monitor pressure variations which are directed to this forward subassembly 19 through a passageway structure 24 originating in a sensing element 25. This sensing element 25 is mounted on a vehicle (not shown) to project into a fluid stream moving relative to the vehicle. Also included in this subassembly 19 are mechanisms 27, 28, subject, at all times, to convenient calibration in moving the respective indicia dials.

In rear subassembly 30, shown in more detail in FIGURE 2, components 31, 32 are arranged to monitor pressure transmitted to these components through passageway structures 33, 34, respectively connected to opposite sides of a restrictive orifice 35 assembly 36 which is installed in a fuel line 37 of the vehicle.

In FIGURE 2, a sectional view, both forward subassembly 19 relating to sensing ram pressures to derive speed values and rear subassembly 30 relating to sensing differential of pressures in fuel line 37 to derive fuel consumption values are shown assembled. This resulting assembly 38 includes overall indicating dial masking cover 14. However, other components of the complete assembly shown in FIGURE 1 are not shown, such as passageway structures 24, 33, 34 and surrounding protective covers or housings 11, 12.

Each of these internal subassemblies 19, 30 has compartmented multiple cylindrical-like framework. In front subassembly 19, concerned essentially with housing speed sensing assemblies, two dials or discs 20, 21 having indicia thereon are rotatively mounted on and within a cylindrical barrel like bearing 40 which projects forwardly from forward framework 41 along major axis x—x of the entire indicating instrument 10.

A centered inner dial 21 having fuel consumption indicia is secured to a shaft 42 which revolves inside barrel bearing 40. A centered outer dial 20 having both speed and distance traveled per unit of fuel indicia is formed with an offset dish-like center 43 to accommodate rotative passage of fuel consumption indicia dial or disc 21. Also this dial is formed with an inside central flanged bearing structure 44 which rotatably is fitted to the outer reduced diameter 46 of the barrel like bearing at its forward end. A flanged shoulder 47 on the fuel dial shaft, positions both fuel and speed dials 21, 20 relative to barrel bearing 40 of forward frame 41.

The lower portion of this front assembly framework contains an expandable chamber 50 which increases in volume as pressure sensed by ram pressure sensor 25 increases. There is a port fitting 51 secured to stationary head 52 of the expandable chamber to receive the passageway structure 24 interconnecting this expandable chamber 50 and ram pressure sensor 25.

The increased pressures effectively are applied against a piston 54 as pressures are confined by a cup-like diaphragm seal 55 held in place with its bead 56 in a groove on stationary chamber head 52 by a retainer 57. Movement of piston 54 is adjustably restrained by a tapering coiled compression spring 60 centered within hollow interior 61 of piston 54. Adjustment of this compression spring occurs as a set screw positioner 62 is moved to adjust its place of contact with the apex end of this tapered coiled compression spring 60. Adjusting set screw positioner 62 is turned within its cylindrical retainer 63 which in turn is braced 64 to stationary chamber head 52.

Lineal movement of expandable chamber portions, i.e., piston 54 and diaphragm 56 is converted to rotary movement of speed indicia dial 20 by a composite linkage assembly 67. A U-like shaped abutment 68 is pivotally mounted 69 to an extension 70 of stationary chamber head 52 in an interference position with an extension 72 of piston 54. Upon being pushed by piston 54, abutment 68 pivots carrying with it the secured lower bent blunted end 74 of a wire-like connector 75 which is directed up to speed indicia dial 20 having its top end 76 curved, bent and inserted into a dial receiving hole 77 located a spaced distance above major axis x—x of the overall indicating instrument 10. The moving wire-like connector 75 causes co-rotation of speed indicia dial 20 completing conversion of the ram pressure expandable chamber 50 movement. Resulting rotative movement of speed disc or dial 20 is modulated by utilizing a coiled torsion spring 79 anchored between this dial 20 and forward frame 41 along major axis x—x of the indicating instrument 10.

The movement of inner fuel consumption indicia dial 21 likewise results from a conversion of initial linear movement which in turn is caused by pressure changes. Referring to FIGURE 1, two pressures occurring, one before and another after a restrictive orifice 35 in vehicle fuel line 37, are made effective within the indicating instrument 10 by connecting respective pressure ports 81, 82 at the orifice 35 location with respective rear framework fittings 83, 84 utilizing some suitable type of passageway structures 33, 34 such as plastic or metal tubing.

Referring to FIGURE 2, the fluid pressures derived from each side of the restrictive orifice are admitted through rear frame structure 85 into its center piece 86 and directed by self contained passageways 87 to its respective sides. These respective pressures thereafter act upon piston and cup diaphragm assemblies 90, 91.

Pistons 92, 93 are connected by an elongated spacing rod-like bolt-nut fastener assembly 94 which passes through a central opening 95 in center piece 86. This piston spacing assembly 94 also includes a smaller cup diaphragm 96 held in place around spacing rod 97 by annular spacers 98, 99 and anchored to center piece 86 by having its bead 101 placed within an annular groove 102 and further retained by a press fit retaining ring 103.

The periphery of this center piece 86 is widened to accommodate two spaced outside diameter shoulders 105, 106 to receive respectively the beads 107, 108 of larger cup diaphragms 109, 110 of piston assemblies 90, 91. Also around the outside diameter of this center piece 86 are several indentations 112 to receive staked portions 113 of front and rear sub-sections 114, 115 of framing 85 surround in part dual piston assemblies 90, 91: holding larger cup diaphragms 109, 110 in place on center piece 86; providing threaded recess structure 116 to receive machine screw fasteners 117 passing through front frame 41 within integral cylindrical guides 118; and supporting a leaf spring assembly 120 which bears against interior 121 of one 93 of the dual pistons to serve as a modulator and damper of piston assembly 122 movements.

The leaf spring assembly 120, comprises: a formed positioning plate 123 interfitting with a recess 124 in rear sub-section 115 of rear frame 85; the return bend leaf spring 125; and a fastener 126 joining spring 125 to positioning plate 123.

There is lineal movement of dual expandable chambers 128, 129, i.e., dual piston assemblies 90, 91 when respective high and low pressures vary as derived from fluid flow originating before and after restrictive orifice 35 in the vehicle's fuel line 37. These respective pressures are constantly being monitored and differentiated in this manner. The resulting linear movement is conveyed into front assembly 19 by a yoke or extending arm 131 secured to forward piston 92 by spacing fastener assembly 94.

Within this front assembly 19 a spiral stem 132 extends rearwardly to engage this yoke. This spiral stem 132 is part of shaft 42 which carries the fuel consumption indicia dial 21. The forward end of this yoke has a restrictive opening 134 which passes any selected cross section of this spiral stem 132 if the cross section is oriented with the restrictive yoke opening. Therefore, lineal movement of the yoke 131 with its restrictive opening permanently positioned relative to the spiral stem causes rotary movement of spiral stem 132, shaft 42 and fuel consumption dial 21. Such rotary movement is modulated and dampened by a torsion spring 136 anchored to both front frame 41 and dial shaft 42 where spiral stem 132 commences.

Calibrations of the overall movements of these fuel consumption monitoring components is basically handled by: design of the entire indicating instrument; incorporation of a suitable orifice 35 in fuel line 37; selection of a leaf spring assembly 120; installation of a torsion spring 136 and ultimately establishing the spiral characteristics of the shaft spiral stem 132 to accommodate readily the manufacturing tolerances and other, so to speak, last minute discovered variations which might otherwise tend to eliminate the accuracy of this fuel consumption indicating function of this indicating instrument assembly 10.

Calibrations of the overall movements of the speed monitoring components is basically handled by: design, again, of the entire indicating instrument 10; incorporation of a suitable ram pressure probe 25 such as a Pitot tube; selection of a compressor spring 60; installation of a torsion spring 79, and ultimately establishing the operating range of the motion transforming linkage 67 by primarily bending portions of linkage 67, such as changing the U abutment 68 contour.

In practice, this overall indicating instrument assembly 10 generally only requires selection of an orifice 35 depending basically on the fuel to be burned, for example, gasoline or oil, and thereafter last minute bending adjustments of spiral stem 132 and/or U abutment link 68.

Each dial 20, 21 is moved independently of the other, deriving its motive power from separate pressure sources, respectively, of fluid flow by the vehicle and fluid flow through fuel line 37 of the vehicle. After each is calibrated to move so the logarithm indicia shown in FIGURE 3 convey speed and fuel consumption accurately, then the derived ratio of distance traveled per unit of fuel is read on the speed dial face at its bottom where indicia are in such resulting ratio terms.

Figure 3:
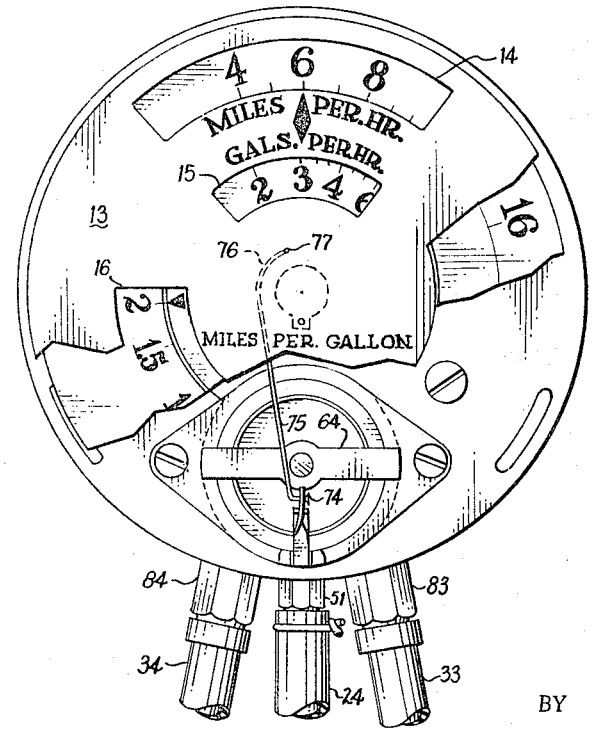
FIGURE 3 is a front view of the indicating instrument structure shown in FIGURE 2, with some portions broken away for purposes of illustration.

For example, unmasked portions of respective dials 20, 21 will present readings such as indicated in FIGURE 3 of: miles per hour (speed dial); gallons per hour (fuel consumption dial); and miles per gallon (distance traveled per unit of fuel consumed as set forth preferably on the speed dial). In marine vehicle operations, such speed could be expressed in nautical miles per hour, i.e., knots. Whatever may be the changes dictated by terminology such as metric or imperial units, substantially the same structure, operation and calibrations are involved in presenting to the operator of a vehicle information indicating its speed, fuel consumption rate and the immediate efficiency value of such performance.

Logarithmic movements of these dials as described are indicated at the fuel flow rate transducer and the vehicle's speed pressure transducer. In fuel flow rate transducer 36 shown in FIGURE 1, fuel flow generates a pressure difference across orifice 35 in proprotion to the square of such flow. This differential pressure is then utilized to generate a resulting force as respective pressures act upon piston and cup diaphragm assemblies 90, 91. This resulting force created by use of these diaphragm or bellows assemblies 90, 91 causes an axial motion of slotted member or arm 131 having restrictive opening or slot 134. Such axial motion increases approximately in proportion to the square root of the differential pressure originating at orifice 35. This occurs because such axial motion is opposed by a non linear reacting spring 136. The spring rate increases with the displacement involved so the net linear motion will vary directly with fuel flow rate. The lineal motion of slotted member 131 causes rotation of spiral stem or helical strip 132 which is attached to dial 21. This helical strip is especially twisted during manufacture and, as necessary, during calibration of instrument 10, so angular or rotative displacement of helical strip 132 and dial 21 will continue to vary as the logarithm of the fuel quantity being measured.

In the vehicle's speed transducer, such as the marine vehicle's water ram pressure sensor 25 shown in FIGURE 1, a ram pressure is generated in proportion to the square of the speed. The pressure change alters expandable chamber or bellows 50. Upon such expansion a force is generated acting against a piston 54. Movement of piston 54 is opposed by springs 60 and 79 and the latter spring 79, through linkage assembly 67, offers non-linear reactive forces. The net movement of piston 54 is proportional to the square root of the force and its movement by linkage 67 is converted to rotate disc or dial 20 in proportion to the logarithm of the square root of the force. Such logarithm movement is essentially obtained initially by design of composite linkage assembly 67 and the spring 79. Then final adjustments and/or calibrations are undertaken by changing the contour of U-shaped abutment or crank portion 68 upon assembly of instrument 10.

The helical strip and slot assembly used in the fuel consumption indicating components could be modified for use in this speed indicating assembly. However, because of the illustrated compact design with the resultant below center placement of speed indicating components, the use of composite linkage assembly 67 is preferred.

This preferred embodiment of this performance indicating instrument assembly 10 is compactly arranged by incorporating diaphragm piston-cylinder assemblies, also herein called expandable chamber assemblies and in respect to one source referred to by trade name, "Bellofram." Possible size reduction of the instrument in another embodiment and some rearrangement is involved wherein a Bourdon tube (not shown) is used as a changing configuration pressure chamber, such as illustrated in United States Patent No. 2,522,299.

The overall purpose and objectives in all embodiments remain similar. The indicating instrument is readily manufactured at comparatively low cost and provided with final on the spot adjustment components altered conveniently by using standard tools making the indicating instruments installation very practical in all vehicles to accurately present to an operator information as to speed, fuel consumption rate and distance traveled per unit of fuel consumed.

I claim:

1. An instrument for installation on a vehicle to present engine performance data to the operator inclusive of speed, fuel flow, and distance traveled per unit of fuel consumption, comprising two rotatable discs movable around a common reference axis, each disc having a respective supporting shaft, one shaft rotating within the other, a housing to encompass the rotatable discs and to rotatably support the disc shafts, one disc having speed and distance traveled per unit of fuel indicia on its face and the other disc having fuel consumption indicia on its face and a pointer located to indicate specific indicia of distance traveled per unit of fuel on the other disc, and multiple pressure change activated changeable volume pressure chamber assemblies: one such pressure chamber assembly, comprising, an orifice for connection to tubing also connected to fluid flow ram pressure sensor, a ram pressure sensor for placement in fluid moving relative to the vehicle connected to the pressure chamber assembly by tubing, projecting chamber portions movably supported on the pressure chamber assembly advancing and retracting as fluid ram pressures increase and decrease respectively, and actuating linkage and a nonlinear reacting spring to convert the linear motion of the projecting chamber portions into circular logarithmic motion of the disc indicating speed; and another changeable volume pressure chamber assembly comprising two adjacent axially aligned pressure chambers, having movable partitions, two ports, one for each adjacent pressure chamber, tubing connected between the chamber ports and ports in a fuel line on the respective sides of a restrictive orifice, a fuel line section having a restrictive orifice, a common projecting chamber portion movably supported on the two chamber assembly advancing and retracting as the differential pressure changes, and additional actuating linkage on a nonlinear reacting spring to convert the linear motion of the common projecting chamber portion into circular logarithmic motion of the disc indicating fuel consumption.

2. A vehicle performance indicating instrument assembly, comprising fuel consumption monitoring and indicating means and velocity monitoring and indicating means, the indicating means of both arranged for logarithmical movement relative to each other to further indicate the distance traveled per unit of fuel used by the vehicle engine, wherein the fuel consumption monitoring and indicating means, comprises:
   (a) a fuel flow restrictive orifice conduit assembly for placement in an engine fuel line having two pressure sampling ports, one port on each side of the restrictive orifice;
   (b) a double chamber differential pressure monitoring assembly, each chamber being variable in volume and having one pressure port, having a common piston movable upon chamber volume changes occurring as the differential pressure is modified;
   (c) pressure confining conduits connecting the pressure sampling ports of the fuel flow restrictive orifice conduit assembly and the pressure ports of each variable volume chamber of the differential pressure monitoring assembly; and
   (d) a logarithmical movement indicia display assembly having modulating, calibrating and damping members connected to the piston of the differential pressure monitoring assembly.

3. A vehicle performance indicating instrument assembly, as claimed in claim 2, wherein the velocity monitoring and indicating means, comprises:
   (a) a fluid ram pressure probe for placement in the fluid through which the vehicle is to be moved;
   (b) a single pressure chamber monitoring assembly having a variable positioned chamber structure movable to change the position of the chamber portions upon changes of fluid ram pressures;
   (c) a pressure confining conduit connecting the fluid ram pressure probe and the single pressure chamber monitoring assembly; and
   (d) a logarithmical movement indicia display assembly having modulating, calibrating and damping members connected to the variable positioned portions of the single pressure monitoring assembly.

4. A vehicle performance indicating instrument assembly, as claimed in claim 3, wherein the modulating members of the respective logarithmical movement indicia assemblies are non-linear reacting springs.

5. A vehicle performance indicating instrument assembly, as claimed in claim 4, wherein the calibrating members of the respective logarithmical movement indicia assemblies are conveniently bendable upon and after final assembly of the operating components of the indicating instrument to finally perfect the logarithmical movement of all indicating means.

References Cited by the Examiner

UNITED STATES PATENTS

| | | |
|---|---|---|
| 1,641,295 | 9/1927 | Schroeder. |
| 1,914,946 | 6/1933 | Glick _____ 73—114 X |
| 2,395,042 | 2/1946 | Flatt _____ 73—114 X |
| 2,500,585 | 3/1950 | Sylvander _____ 73—113 |

OTHER REFERENCES

German printed application (Hardebeck), August 1956.

RICHARD C. QUIESSER, *Primary Examiner.*

J. W. MYRACLE, *Assistant Examiner.*